United States Patent
Bennah et al.

(10) Patent No.: US 9,563,545 B2
(45) Date of Patent: Feb. 7, 2017

(54) AUTONOMOUS PROPAGATION OF SYSTEM UPDATES

(71) Applicant: Lenovo Enterprise Solutions (Singapore) Pte. Ltd., Singapore (SG)

(72) Inventors: Albert D. Bennah, Cary, NC (US); Aaron J. King, Jr., Morrisville, NC (US); Melissa J. Moulton, Raleigh, NC (US); David M. Roth, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 68 days.

(21) Appl. No.: 14/288,671

(22) Filed: May 28, 2014

(65) Prior Publication Data

US 2015/0347280 A1 Dec. 3, 2015

(51) Int. Cl.
| | |
|---|---|
| *G06F 11/00* | (2006.01) |
| *G06F 11/36* | (2006.01) |
| *H04L 29/08* | (2006.01) |
| *G06F 11/22* | (2006.01) |
| *G06F 9/445* | (2006.01) |
| *H04L 12/26* | (2006.01) |
| *H04L 29/06* | (2006.01) |
| *H04L 12/24* | (2006.01) |

(52) U.S. Cl.
CPC .......... *G06F 11/3688* (2013.01); *G06F 8/65* (2013.01); *G06F 11/2284* (2013.01); *H04L 41/0869* (2013.01); *H04L 43/50* (2013.01); *H04L 63/00* (2013.01); *H04L 67/104* (2013.01); *H04L 67/34* (2013.01); *H04L 41/0836* (2013.01)

(58) Field of Classification Search
CPC .................. G06F 11/3688; G06F 11/2284
See application file for complete search history.

(56) References Cited

U.S. PATENT DOCUMENTS

| | | | |
|---|---|---|---|
| 7,734,717 B2 | 6/2010 | Saarimaki et al. | |
| 7,890,952 B2 | 2/2011 | Marion et al. | |
| 8,234,705 B1 * | 7/2012 | Roskind .................... | G06F 8/65 726/22 |
| 8,316,364 B2 | 11/2012 | Stein | |

(Continued)

FOREIGN PATENT DOCUMENTS

WO 2010077593 A1 7/2010

OTHER PUBLICATIONS

Anonymous, "Self-Organizing Network", wikipedia.org, pp. 1-4, Last Modified Feb. 10, 2014.

*Primary Examiner* — Bryce Bonzo
*Assistant Examiner* — Katherine Lin
(74) *Attorney, Agent, or Firm* — Law Office of Jim Boice

(57) ABSTRACT

A method, system, and/or computer program product propagates system upgrades to peer computers in a peer community. A peer community is defined by identifying peer computers that each have a copy of a same system component. Each of the peer computers in the peer community is autonomous, such that no peer computer controls another peer computer. A test computer is selected from the peer computers. An upgrade to a system component on the test computer is installed and tested. In response to the upgrade to the system component functioning properly within the test computer, a message is sent to other peer computers within the peer community recommending that they install the upgrade.

19 Claims, 4 Drawing Sheets

(56) References Cited

U.S. PATENT DOCUMENTS

| | | | |
|---|---|---|---|
| 8,381,208 B2 | 2/2013 | Burke et al. | |
| 8,584,113 B2 | 11/2013 | McCurdy et al. | |
| 2006/0080658 A1* | 4/2006 | Marion | G06F 8/61 |
| | | | 717/177 |
| 2008/0209414 A1* | 8/2008 | Stein | G06F 8/65 |
| | | | 717/173 |
| 2011/0106886 A1 | 5/2011 | Nolterieke et al. | |
| 2013/0218915 A1* | 8/2013 | Billau | H04W 12/10 |
| | | | 707/755 |
| 2014/0068566 A1* | 3/2014 | Coronado | G06F 8/665 |
| | | | 717/127 |

\* cited by examiner

AUTONOMOUS PROPAGATION OF SYSTEM UPDATES

BACKGROUND

The present disclosure relates to the field of computers, and specifically to the use of computers in a peer community. Still more particularly, the present disclosure relates to propagating system updates in multiple peer computers within a peer community.

Whenever a system update is performed on a computer system, adverse consequences may occur. For example, the addition of a new hardware unit or a new/upgrade software to a computer system may cause other components within the computer system to fail or otherwise be degraded.

SUMMARY

A method, system, and/or computer program product propagates system upgrades to peer computers in a peer community. A peer community is defined by identifying peer computers that each have a copy of a same system component. Each of the peer computers in the peer community is autonomous, such that no peer computer controls another peer computer. A test computer is selected from the peer computers. An upgrade to a system component on the test computer is installed and tested. In response to the upgrade to the system component functioning properly within the test computer, a message is sent to other peer computers within the peer community recommending that they install the upgrade.

DETAILED DESCRIPTION

Figure 1:
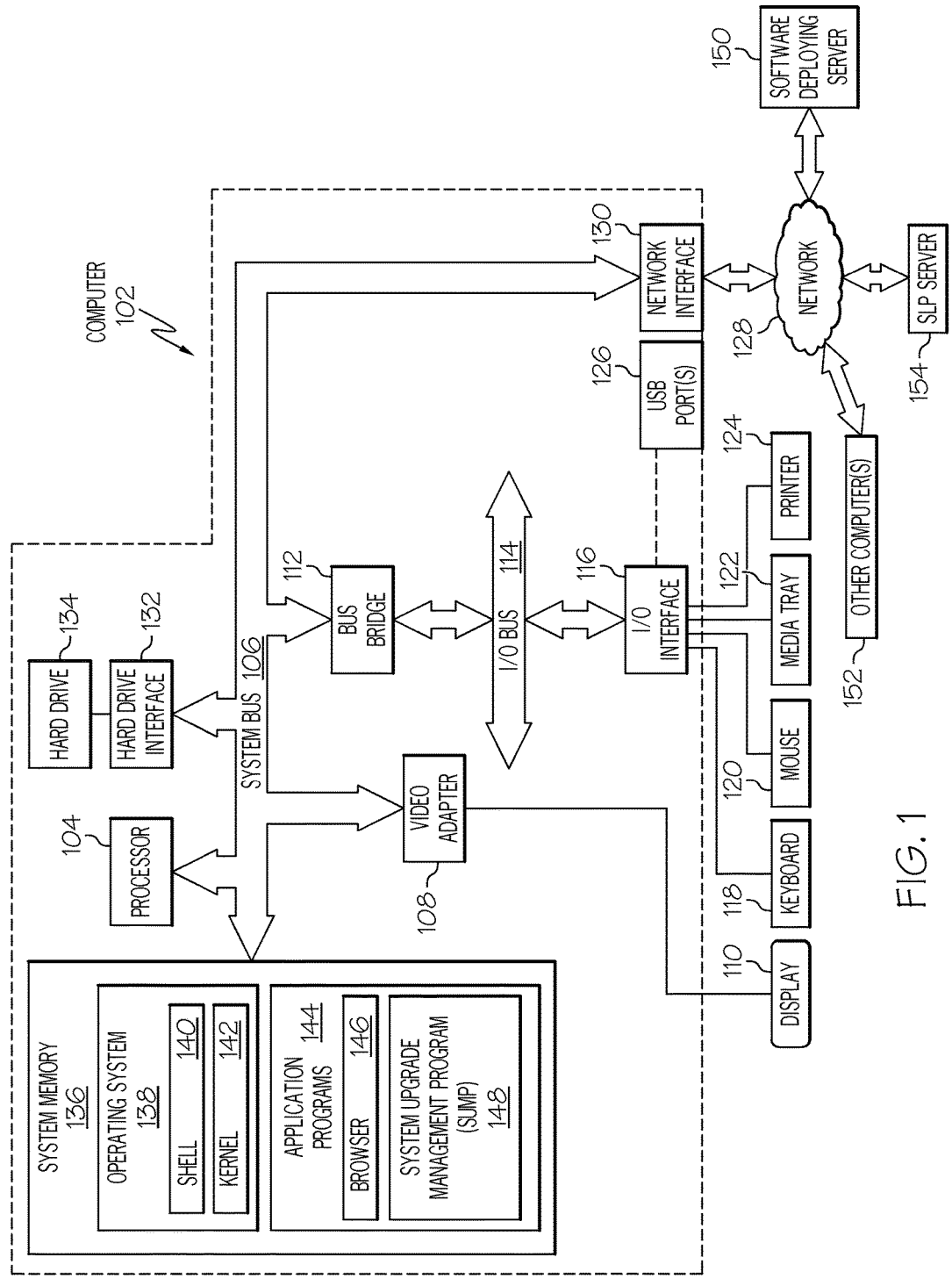
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152 and/or a Service Location Protocol (SLP) server 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a System Upgrade Management Program (SUMP) 148. SUMP 148 includes code for implementing the processes described below, including those described in FIGS. 2-5. In one embodiment, computer 102 is able to download SUMP 148 from software deploying server 150, including in an on-demand basis, wherein the code in SUMP 148 is not downloaded until needed for execution. Note further that, in one embodiment of the present invention, software deploying server 150 performs all of the functions associated with the present invention (including execution of SUMP 148), thus freeing computer 102 from having to use its own internal computing resources to execute SUMP 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
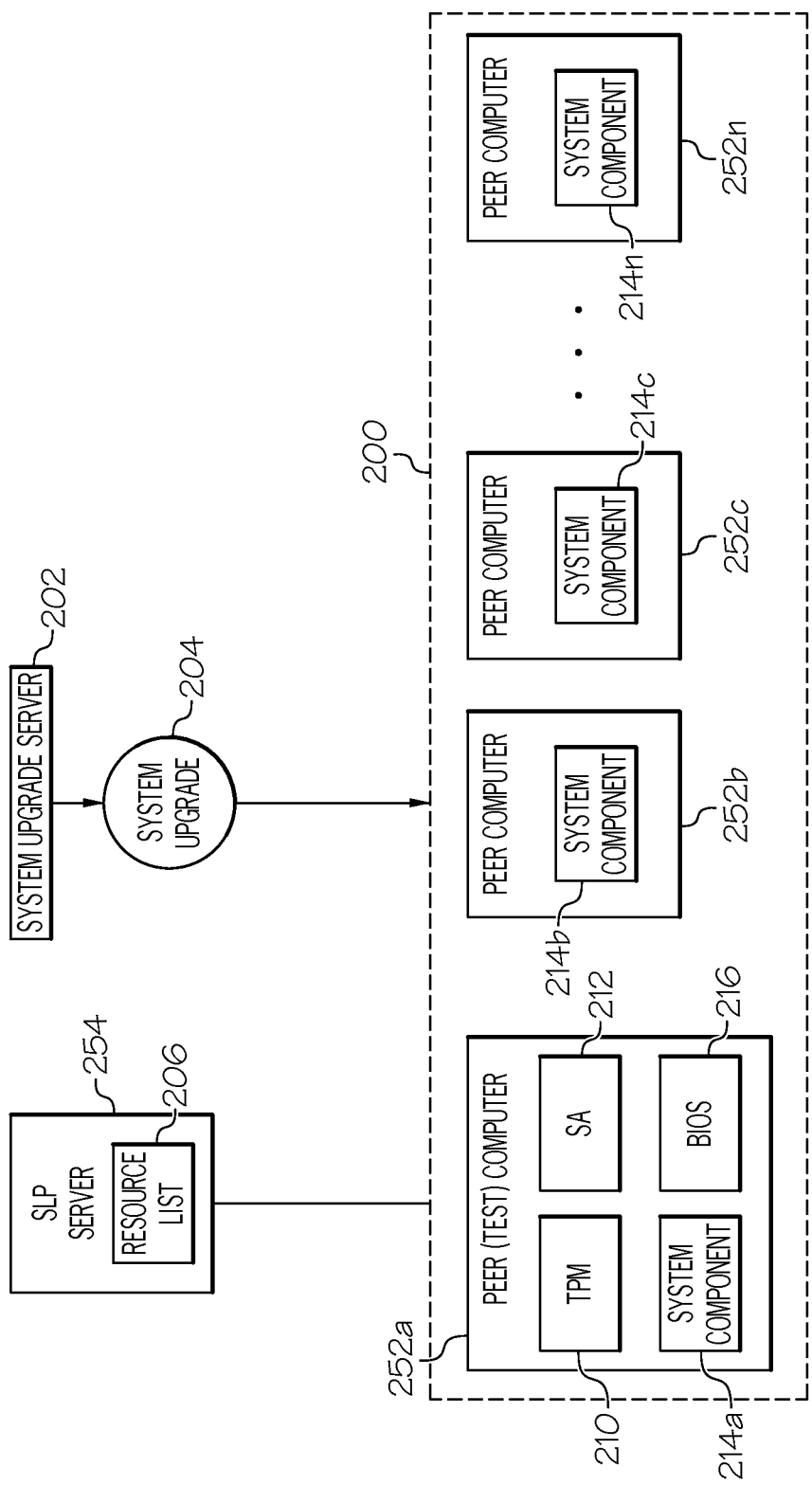
FIG. 2 illustrates an exemplary peer community of peer computers according to one embodiment of the present invention.

With reference now to FIG. 2, an exemplary peer community 200 of peer computers 252a-252n (where "n" is an integer) according to one embodiment of the present invention is presented. In one embodiment, assume that a system upgrade server 202 (e.g., computer 102 shown in FIG. 1) is able to provide a system upgrade 204 to one or more of the peer computers 252a-252n (e.g., other computer(s) 152 shown in FIG. 1). In one embodiment, this system upgrade 204 is a software upgrade (e.g., a patch, new version of a program, an initial and new software program, etc.). In another embodiment, system upgrade 204 is a hardware unit (e.g., a cooling fan, memory card, CPU, blade in a server chassis, etc.) that will be installed (in one embodiment, replacing an existing hardware unit) on a computer. In the hardware installation embodiment, the system upgrade server 202 orders, ships, and sends an installation instruction for the hardware system upgrade 204 to one or more of the peer computers 252a-252n. In another embodiment, system upgrade 204 is a combination of hardware and software, as firmware, and/or as a combination of distinct hardware and software components.

In accordance with a preferred embodiment of the present invention, the peer computers 252a-252n are members of a peer community 200 that share common parameters. For example and as depicted, in one embodiment every one of the peer computers 252a-252n that are members of the peer community 200 has a similar, if not identical copy, of a system component 214 (depicted as system components 214a-214n). In various embodiments of the present invention, system component 214 is a software program (i.e., operating system, application program, browser, etc.), a hardware device (e.g., a memory card, a power supply, a processor, a network interface card, etc.), or a combination of hardware components (e.g., a motherboard).

In one embodiment, in order to define which peer computers are designated as members of the peer community 200, data analytics determine how tightly or loosely coupled these communities are. For example, a loose community of servers may be formed; a tighter community of POWER-based servers may also be formed; or still, an even tighter community of IBM x240 servers may be formed. That is, the peer community 200 is defined according to what common components (hardware and/or software) are shared by certain computers, and these certain computers are then consolidated into the peer community 200, which is defined according to these shared attributes among the peer computers.

Employing this scheme (i.e., a peer community 200 in which the member peer computers share a predetermined/predefined feature(s)), a collaborative ecosystem is created in which members of a community can recommend and/or propagate their certified system software solutions (and/or other system upgrades) to other members (peer computers within the same peer community) that choose to consume them. This creates a more intelligent, secure and dynamic way of performing systems updates where individual nodes can take localized actions regarding their own updates.

In order to determine which computers are proper candidates to become a member of the peer community 200 (thus forming at least one community as defined above), in one embodiment the Service Location Protocol (SLP) is used. SLP provides a framework for providing information about the existence, location, and configuration of networked services/devices. That is, a first device (e.g., the system upgrade server 202 or one of the peer computers 252a-252n shown in FIG. 2) issues a request to an SLP server 254 (e.g., SLP server 154 shown in FIG. 1). The SLP server 254 has a resources list 206, which includes a location and description of multiple peer computers that are accessible. The system upgrade server 202 or one of the peer computers 252a-252n then requests the location (and/or availability) of computers that meet certain parameters (e.g., are running certain software, have certain hardware components, have certain operational parameters such as speed, bandwidth, etc.). Once these computers are located, they are consolidated into a peer community of peer computers that share the specified parameters set forth by the system upgrade server 202 or one of the peer computers 252a-252n, in order to form the specific community of peer computers.

In one embodiment, resources list 206 also includes information related to the ability of certain computers to identify, store and share trusted solutions. For example, the resources list 206 may contain a listing of all available computers that run a common application, have the same type of hardware, etc., and thus are candidates for sharing trusted solutions such as software/hardware upgrades.

In one embodiment, resources list 206 contains a listing of computers (and/or their users) that have previously expressed an interest in receiving upgrades/updates to their resources. That is, certain computers and/or their users may not want to received patches/upgrades/etc. If so, then they are deemed to be poor candidates for a network of peer computers who will receive such patches/upgrades/etc. However, if a computer/user has indicated an interest/desire to receive such patches/upgrades/etc., then that computer/user is deemed to be a good candidate for becoming a member of the network of peer computers who will receive such patches/upgrades/etc.

Continuing with FIG. 2, assume for exemplary/explanatory purposes that system upgrade 204 is a manufacturer-signed systems software package (a new program, an upgrade or patch to an existing program, etc.) that has become available. The first step is to elect one of the peer computers 252a-252n to be designated as the "test computer" (e.g., peer (test) computer 252a), which is elected to download, install and validate the systems software package. The election of a primary node (e.g., peer (test) computer 252a) from within the peer community 200 (i.e. the peer computers 252a-252n) to perform this task may take into account several factors.

In one embodiment, the community member with the least significant workload (or most available cycles) is elected to be the test computer. For example, if peer computer 252a has 10 jobs in its work queue, but peer computer 252b has 100 jobs in its work queue, then peer computer 252a is a better candidate for being elected as the test computer.

In one embodiment, the community member with a history of the greatest number of secure sharing is selected. For example, assume that peer computer 252a has tested and shared test results with the other peer computers 252a-252n (or, alternatively, another community of computers) for 100 system upgrades. If peer computer 252b has only tested 10 system upgrades in the past, then peer computer 252a is elected to be the test computer for the current systems software package.

In one embodiment, the community member with historically the least number of errors after system updates is elected as the test computer. For example, assume that peer computer 252a has tested 10 system upgrades in the past, with a resulting 2 errors experienced by its system components. Assume further that peer computer 252b has tested 10 system upgrades in the past, with a resulting 5 errors experienced by its system components. This may indicate that peer computer 252b is less stable than peer computer 252a, thus resulting in more errors that are not attributable to the system upgrade itself, and thus makes peer computer 252a a better candidate for being elected as the test computer. This assumes that peer computer 252a and peer computer 252b are somehow different. That is, even if peer computer 252a and peer computer 252b are structurally identical, their performance may differ based on their connections to different resources, parts degradation and/or anomalies, etc.

In one embodiment, the community member with historically the greatest number of errors after system updates is elected as the test computer. For example, assume that peer computer 252a has tested 10 system upgrades in the past, with a resulting 20 errors experienced by its system components. Assume further that peer computer 252b has tested 10 system upgrades in the past, with a resulting 3 errors experienced by its system components. This may indicate that peer computer 252b overlooks problems in the system upgrade (e.g., due to insensitive sensors, components with excessively broad operation ranges, etc.) than peer computer 252a, thus making peer computer 252b a poor candidate for being elected as the test computer. Thus, peer computer 252a is elected to be the test computer.

These performance criteria are nonlimiting, such that other performance criteria not rendered explicit herein are not precluded by this invention.

Prior to consuming the new package (e.g., system upgrade 204), the primary member of the computing community (i.e., peer (test) computer 252a) will ensure that a backup of its current systems software exists and is accessible by its peers. When the primary member has automatically downloaded and installed a new system software update, it enters an autonomic self-evaluation period during which it demotes itself to a lower trust level among its peers (i.e., other peer computers 252b-252n within the peer community 200). During this phase, this community member (i.e., peer (test) computer 252a) is untrusted and effectively quarantined. A pre-determined set of validation and self-checkup routines are performed during this period. Various pass/fail criteria may be used when evaluating the system upgrade.

In one embodiment, a system upgrade 204 passes if there is a successful operation of a Trusted Platform Module (TPM) cryptoprocessor (depicted as TPM 210) within the test computer (peer (test) computer 252a) after the system upgrade 204 has been installed/tested. TPM 210 is a dedicated microprocessor that integrates cryptographic keys into resources/devices. If the TPM 210 has been compromised by the installation of the system upgrade 204, then a problem with the system upgrade 204 is presumed. TPM is an exemplary root-of-trust validation. Other root-of-trust systems can likewise be used to evaluate the system impact of installing the system upgrade 204.

In one embodiment, a successful boot and/or Power On Self-Test (POST) of the node (i.e., peer (test) computer 252a) after installing the system upgrade 204 indicates whether or not the installation passes. That is, if the peer (test) computer 252a can no longer boot/POST normally after installing the system upgrade 204 (e.g., using a Basic Input/Output System—BIOS chip, depicted as BIOS 216), then there is a presumed problem with the system upgrade 204.

In one embodiment, a successful execution of embedded utilities such as a Systems Analyzer (SA 212) determines if the system upgrade 204 passes or fails. SA 212 includes a systems analysis program that collects and analyzes system information (e.g., component identification, operational data such as speed, error rate, etc.) about a computer. If this collection/analysis identifies more than some predefined quantity of problems with the computer after the system upgrade 204 is installed (e.g., on peer (test) computer 252a), then the system upgrade 204 fails, and the peer (test) computer 252a will not give other peer computers (i.e. peer computers 252b-252n) a recommendation to install this system upgrade 204. Other third party system analytics tools can also be used to make this determination.

These validation criteria are nonlimiting, such that other validation criteria not rendered explicit herein are not precluded by this invention.

Upon successful evaluation of the update (i.e., installation of the system upgrade 204 onto the peer (test) computer 252a) for a predetermined period of time, the compute node can restore its previous trust level to what it was prior to update. Peer (test) computer 252a then notifies its peers (peer computers 252b-252n) of successful testing. Peer (test) computer 252a shares the results from its self-assessment, thereby proving a clean bill of health for system upgrade 204. Peer (test) computer 252a then resumes its position as the elected leader of the peer community 200. Other peer community members (i.e., one or more of the peer computers 252b-252n) may now begin to consume the systems software update (system upgrade 204) as their schedules and workloads allow.

Upon encountering any serious errors during the self-validation, the test computer node (peer (test) computer 252a) may issue a distress message via known means to its community (i.e., peer computers 252b-252n). Alternatively, peer (test) computer 252a may simply stop responding to heartbeat queries from the other peer computers 252b-252n. A heartbeat query is defined as a query to the peer (test) computer 252a to provide a periodic signal indicating that the peer (test) computer 252a is 1) operating properly within nominal ranges, and/or 2) is able to communicate with the peer computers 252b-252n.

Note that in one embodiment, the peer (test) computer 252a is quarantined (i.e., isolated from the other peer computers 252b-252n) while installing and testing the system upgrade 204. This prevents the other peer computers 252b-252n from being damaged by a faulty system upgrade 204. After a predetermined amount of time in such a failed state, the peer (test) computer 252a will begin an automatic system software rollback process, wherein the last good software package (i.e., a previous system upgrade or the original program itself) is reinstalled to the quarantined system (peer (test) computer 252a).

In one embodiment, the system software manufacturer (which in one embodiment manages the system upgrade server 202) is notified as to the success or failure of the software (system upgrade 204) installation. An overall assessment of quality can then be made by the manufacturer based on a plurality of similar feedback from various customer environments.

Figure 3:
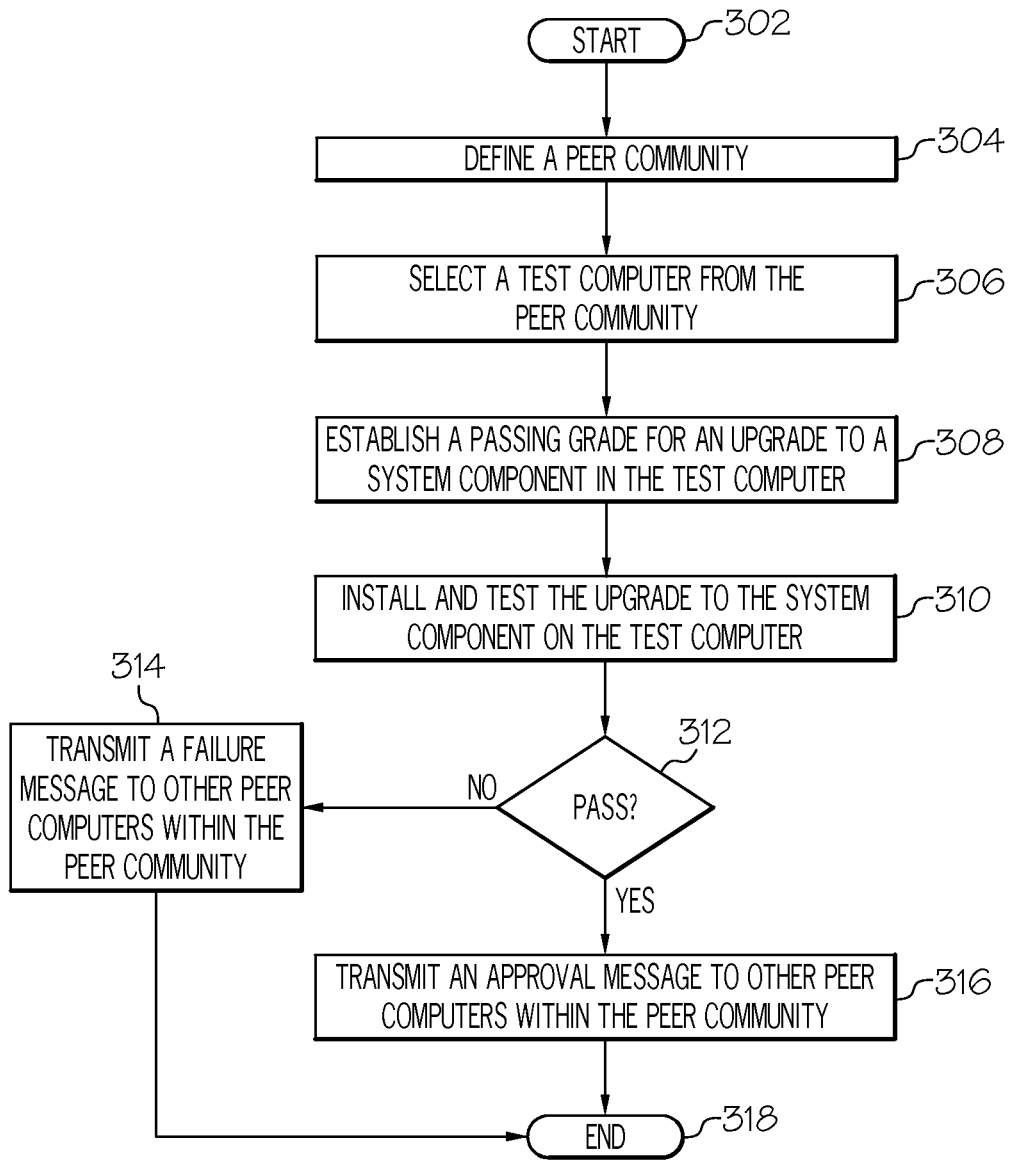
FIG. 3 is a high-level flowchart of one or more steps performed by one or more processors to propagate a system upgrade to peer computers in a peer community.

With reference now to FIG. 3, a high-level flowchart of one or more steps performed by one or more processors to propagate a system upgrade to peer computers in a peer community is presented in accordance with one or more embodiments of the present invention.

After initiator block 302, a peer community is defined (block 304). This peer community is defined by one or more processors identifying peer computers that each contain a copy of at least one similar (if not identical) system component. That is, each member of the peer community has a similar/identical system component, such that a system upgrade to one of the peer computers will likely affect the similar/identical system component found in each of the peer computers in a similar manner. Note that in one embodiment, the peer computers within the peer community are autonomous (i.e., there is no master/servant server/client relationship between two computers), such that no peer computer controls another peer computer within the peer community.

As depicted in block 306, a test computer is then elected/selected from the peer computers within the peer community.

As depicted in block 308, a passing grade is established for an upgrade (e.g., system upgrade 204) to the system component.

As depicted in block 310, the upgrade to the system component on the test computer is installed and tested.

As depicted in query block 312, a query is made to determine whether the installed upgrade passes (e.g., does not impart undue damage to the components of the test computer). If the installation causes a failure in the test computer (still at query block 312), then a failure message is transmitted to the other peer computers indicating that the upgrade will damage them if installed (block 314). However, if the installation of the upgrade does not damage the test computer (query block 312), such that the upgrade to the system component reaches the passing grade, then an approval message is transmitted to other peer computers within the peer community (block 316). This approval message recommends installing the upgrade on the other peer computers within the peer community. The process ends at terminator block 318.

In one embodiment of the present invention, the method further comprises identifying which of the peer computers has the lowest current workload (i.e., which of the peer computers within the peer community is the least busy). The peer computer from the peer community that has the lowest current workload is then elected to be the test computer.

In one embodiment of the present invention, the method further comprises identifying an importance of workloads being performed by the peer computers, where the importance of the workloads is based on predefined parameters. That is, each of the peer computers is executing a different job. Each of these different jobs has been previously ranked as to their importance (based on any criteria desired by the system). An identification is then made as to which of the peer computers has the least important workload as compared to workloads of other peer computers. The peer computer from the peer community that has the least important workload is then selected to be the test computer.

In one embodiment of the present invention, the method further comprises identifying which of the peer computers has a highest quantity of previous upgrade tests. For example, if peer computer 252a in FIG. 2 has downloaded and tested 10 system upgrades in the past (or alternatively within the past limited period, such as the past six months), and peer computer 252b has downloaded and tested only 5 system upgrades during that same time, then peer computer 252a will be selected/elected to be the test computer.

In one embodiment of the present invention, the method further comprises identifying which of the peer computers from the peer community has a lowest current workload (i.e., is the least busy). For example, assume that peer computer 252a in FIG. 2 currently has 10 pending jobs, while peer computer 252b has only 5 pending jobs, In this example, peer computer 252a is elected/selected to function as the test computer for installing and testing the system upgrade, and then making the appropriate recommendation to the other peer computers (including peer computer 252b).

In one embodiment of the present invention, the method further comprises identifying which of the peer computers has a fewest quantity of system errors after previous upgrade installations and tests. For example, if peer computer 252a in FIG. 2 had 10 system errors (e.g., errors to its software and/or hardware components) after installing/testing 100 system upgrades in the past, and peer computer 252b had 20 system errors after installing/testing the same number (100) of system upgrades in the past, then peer computer 252a is deemed to be more stable, and thus will be selected as the test computer.

In one embodiment of the present invention, the system component (that may or may not be affected by the system upgrade) is a software component, such as an operating system, a boot program, an application, a browser, etc.

In one embodiment of the present invention, the system component (that may or may not be affected by the system upgrade) is a hardware component, such as a memory card, a power supply, a display, a network interface card, etc.

In one embodiment of the present invention, the test computer and all other peer computers within the peer community have identically configured hardware and software. Thus, in this embodiment, if the system upgrade passes (such that no undue damage is done to the test computer and/or the system upgrade provides the promised functionality), then the approval message recommending that the system upgrade be installed on the other peer computers is transmitted with no restrictions.

Figure 4:
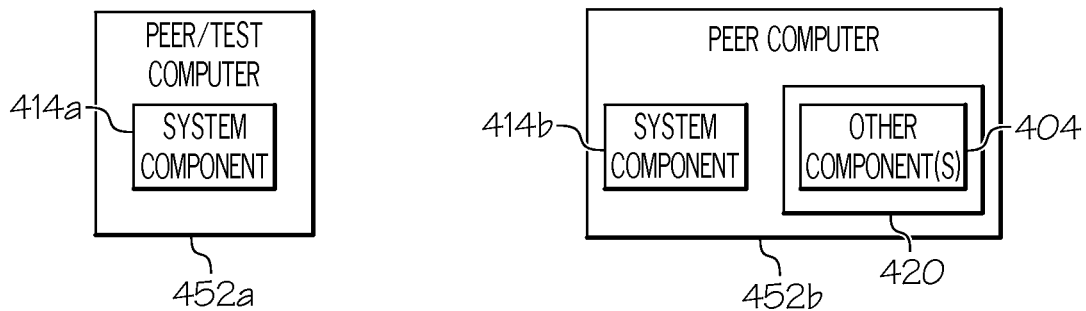
FIG. 4 illustrates an embodiment of the present invention in which one or more other peer computers in the peer community have component(s) not found in the test computer.
Figure 5:
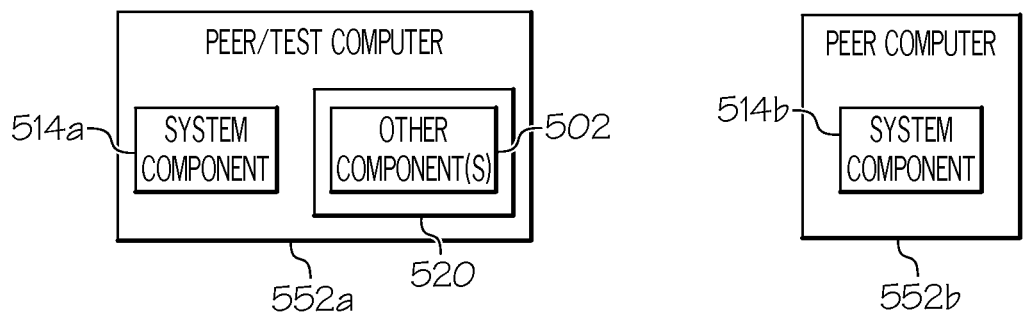
FIG. 5 depicts an embodiment of the present invention in which a test computer has component(s) not found in one or more other peer computers in the peer community.

However, in one embodiment of the present invention, other peer computers within the peer community contain other components not found in the test computer. For example, consider FIG. 4. As depicted in FIG. 4, a peer/test computer 452a (analogous to the peer (test) computer 252a shown in FIG. 2) has a system component 414a (analogous to system component 214a shown in FIG. 2). The other peer computer 452b (analogous to peer computer 252b in FIG. 2) has the same system component (shown as system component 414b) as the system component 414a found in peer/test computer 452a. However, peer computer 452b also has other component(s) 404. Thus, while installing the system upgrade onto the peer/test computer 452a may pass (i.e., impose no undesired effects on the peer/test computer 452a), the presence of the other component(s) 404 on peer computer 452b may cause problems if the same system upgrade is installed on peer computer 452b. That is, the other component(s) 404 may react to the system upgrade in a way not experienced by the peer/test computer 452a, since the peer/test computer 452a does not have these other component(s) 404. Thus, in this embodiment, the method further comprises transmitting a modified approval message to the other peer computers upon the system upgrade passing when installed in the peer/test computer. This modified approval message advises the other peer computers (including peer computer 452a) to isolate (as indicated by isolation fence 420) the other component(s) 404 from the system component within the other peer computers before installing the upgrade. If the other component(s) 404 are software, then the isolation fence 420 may be instructions to the peer computer 452*b* to prevent any access to this software. If the other computer(s) 404 are hardware, then the isolation fence 420 may be 1) a power-down of the other component(s) 404, or 2) instructions to physically disconnect (e.g., by an electro-mechanical actuator) the other component(s) 404 from other components within the peer computer 452*b*.

In one embodiment of the present invention, the test computer comprises the system component and other components, and other peer computers within the peer community do not contain the other components. For example, consider now FIG. 5. As depicted the peer/test computer 552*a* has the same system component 514*a* as found in peer computer 552*b* (depicted as system component 514*b*). However, in this embodiment, the peer/test computer 552*a* has additional hardware and/or components, depicted as other component(s) 502, which could affect how the system upgrade impacts the system component 514*a*. In order to avoid any such effect (and thus place into doubt whether a system upgrade whose performance passed after being installed in the peer/test computer 552*a*), the method further comprises isolating the other component(s) 502 from the system component 514*a* within the peer/test computer 552*a* prior to installing and testing the upgrade to the system component 514*a* on the peer/test computer 552*a*. This isolation is performed by an isolation fence 520, which is analogous to the isolation fence 420 described in FIG. 4. By isolating the other component(s) 502 before installing/testing the system upgrade, the other component(s) 502 do not affect the testing of the upgrade to the system component 514*a*.

In one embodiment of the present invention, the method further comprises blocking any communications between the test computer and other peer computers within the peer community until the upgrade to the system component reaches the passing grade. Thus, if there is a problem that arises when upgrading the system component in the test computer, the other peer computers will not be affected, since they have been isolated (communications blocked) from the test computer.

In one embodiment of the present invention, the method further comprises establishing the passing grade for the upgrade to the system component based on a Trusted Platform Module (TPM) within the test computer successfully generating a cryptographic key after the upgrade has been installed and tested, as described above.

In one embodiment of the present invention, the method further comprises establishing the passing grade for the upgrade to the system component based on the test computer successfully rebooting after the upgrade has been installed and tested, as described above.

In one embodiment of the present invention, the method further comprises establishing the passing grade for the upgrade to the system component based on the test computer successfully passing a systems analysis after the upgrade has been installed and tested, as described above.

In one embodiment of the present invention, the method further comprises establishing the passing grade for the upgrade to the system component based on the test computer successfully passing a Power On Self-Test (POST) after the upgrade has been installed and tested, as described above.

As described herein in one or more embodiments, the present invention uses a novel peer-based propagation scheme, whereby computing nodes (i.e., systems, computers) that meet certain criteria may dynamically form a community to share and consume certified systems software solutions. In one embodiment, a registration mechanism allows nodes within a community to become aware of each other via means such as the Service Location Protocol (SLP).

As presented herein, in one or more embodiments data analytics are used to determine how tightly or loosely coupled these communities are. For example, a loose community of servers may be formed; a tighter community of POWER-based servers may also be formed; or still, an even tighter community of IBM x240 servers may be formed.

Employing this scheme, a collaborative ecosystem is created in which members of a community can recommend and/or propagate their certified system software solutions to other members that choose to consume them. This creates a more intelligent, secure and dynamic way of performing systems updates where individual nodes can take localized actions regarding their own updates.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for propagating system upgrades to peer computers in a peer community, the method comprising:
    defining a peer community, wherein the peer community is defined by one or more processors identifying peer computers that each contain a copy of a system component, wherein each copy of the system component is identical, and wherein the peer computers are autonomous such that no peer computer controls another peer computer within the peer community;
    selecting, by one or more processors, a test computer, wherein the test computer is selected from the peer computers within the peer community;
    establishing, by one or more processors, a passing grade for an upgrade to the system component;
    installing and testing, by one or more processors, the upgrade to the system component on the test computer;
    in response to the upgrade to the system component reaching the passing grade, transmitting an approval message to other peer computers within the peer community, wherein the approval message recommends installing the upgrade on the other peer computers within the peer community;
    identifying, by one or more processors, which of the peer computers has a highest quantity of previous upgrade tests; and
    selecting, by one or more processors, a peer computer from the peer community that has the highest quantity of previous upgrade tests as the test computer.

2. The method of claim 1, further comprising:
    identifying, by one or more processors, which of the peer computers has a lowest current workload; and selecting, by one or more processors, a peer computer from the peer community that has the lowest current workload as the test computer.

3. The method of claim 1, further comprising:
identifying, by one or more processors, an importance of workloads being performed by the peer computers prior to installing the upgrade to the system component, wherein the importance of the workloads is based on predefined parameters;
identifying, by one or more processors, which of the peer computers has a least important workload prior to installing the upgrade to the system component; and
selecting, by one or more processors, a peer computer from the peer community that has the least important workload, prior to installing the upgrade to the system component, as the test computer.

4. The method of claim 1, further comprising:
identifying, by one or more processors, which of the peer computers has a fewest quantity of system errors after previous upgrade installations and tests; and
selecting, by one or more processors, a peer computer from the peer community that has the fewest quantity of system errors after the previous upgrade installations and tests as the test computer.

5. The method of claim 1, wherein the system component is a software component.

6. The method of claim 1, wherein the system component is a hardware component.

7. The method of claim 1, wherein the test computer and all other peer computers within the peer community have identically configured hardware and software, and wherein the method further comprises:
transmitting, by one or more processors, the approval message with no restrictions.

8. The method of claim 1, wherein other peer computers within the peer community contain other components not found in the test computer, and wherein the method further comprises:
transmitting a modified approval message to the other peer computers, wherein the modified approval message advises the other peer computers to isolate the other components from the system component within the other peer computers before installing the upgrade.

9. The method of claim 1, wherein the test computer comprises the system component and other components, wherein other peer computers within the peer community do not contain the other components, and wherein the method further comprises:
prior to installing and testing the upgrade to the system component on the test computer, isolating the other components from the system component within the test computer, such that the other components do not affect the testing of the upgrade to the system component.

10. The method of claim 1, further comprising:
blocking, by one or more processors, any communications between the test computer and other peer computers within the peer community until the upgrade to the system component reaches the passing grade.

11. The method of claim 1, further comprising:
establishing, by one or more processors, the passing grade for the upgrade to the system component based on a Trusted Platform Module (TPM) within the test computer successfully generating a cryptographic key after the upgrade has been installed and tested.

12. The method of claim 1, further comprising:
establishing, by one or more processors, the passing grade for the upgrade to the system component based on the test computer successfully rebooting after the upgrade has been installed and tested.

13. The method of claim 1, further comprising:
establishing, by one or more processors, the passing grade for the upgrade to the system component based on the test computer successfully passing a systems analysis after the upgrade has been installed and tested.

14. The method of claim 1, further comprising:
establishing, by one or more processors, the passing grade for the upgrade to the system component based on the test computer successfully passing a Power On Self-Test (POST) after the upgrade has been installed and tested.

15. A computer program product for propagating system upgrades to peer computers in a peer community, wherein the computer program product comprises a computer readable storage medium having program doe embodied therewith, the program code readable and executable by a processor to perform a method comprising:
defining a peer community, wherein the peer community is defined by one or more processors identifying peer computers that each contain a copy of a system component, wherein each copy of the system component is identical, and wherein the peer computers are autonomous such that no peer computer controls another peer computer within the peer community;
selecting a test computer, wherein the test computer is selected from the peer computers within the peer community;
establishing a passing grade for an upgrade to the system component;
installing and testing the upgrade to the system component on the test computer;
in response to the upgrade to the system component reaching the passing grade, transmitting an approval message to other peer computers within the peer community, wherein the approval message recommends installing the upgrade on the other peer computers within the peer community;
identifying which of the peer computers has a fewest quantity of system errors after previous upgrade installations and tests; and
selecting a peer computer from the peer community that has the fewest quantity of system errors after the previous upgrade installations and tests as the test computer.

16. The computer program product of claim 15, wherein the system component is a software component.

17. A system comprising:
a processor, a computer readable memory, and a computer readable storage medium;
first program instructions to define a peer community, wherein the peer community is defined by one or more processors identifying peer computers that each contain a copy of a system component, wherein each copy of the system component is identical, and wherein the peer computers are autonomous such that no peer computer controls another peer computer within the peer community;
second program instructions to select a test computer, wherein the test computer is selected from the peer computers within the peer community;
third program instructions to establish a passing grade for an upgrade to the system component;
fourth program instructions to install and test the upgrade to the system component on the test computer; and fifth program instructions to, in response to the upgrade to the system component reaching the passing grade, transmit an approval message to other peer computers within the peer community, wherein the approval message recommends installing the upgrade on the other peer computers within the peer community;

sixth program instructions to establish the passing grade for the upgrade to the system component based on a Trusted Platform Module (TPM) within the test computer successfully generating a cryptographic key after the upgrade has been installed and tested; and wherein the first, second, third, fourth, fifth and sixth program instructions are stored on the computer readable storage medium and executed by the processor via the computer readable memory.

18. The system of claim 17, wherein the system component is a software component.

19. The system of claim 17, wherein the system component is a hardware component.

* * * * *